United States Patent
Schroder et al.

(10) Patent No.: US 10,815,734 B2
(45) Date of Patent: Oct. 27, 2020

(54) EARTH-BORING TOOLS INCLUDING POLYMER MATRIX COMPOSITE HARDFACING MATERIAL AND RELATED METHODS

(71) Applicant: Baker Hughes Holdings LLC, Houston, TX (US)

(72) Inventors: Jon David Schroder, The Woodlands, TX (US); James L. Overstreet, Tomball, TX (US); Jimmy W. Eason, The Woodlands, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 129 days.

(21) Appl. No.: 15/990,459

(22) Filed: May 25, 2018

(65) Prior Publication Data

US 2018/0340375 A1    Nov. 29, 2018

Related U.S. Application Data

(60) Provisional application No. 62/511,894, filed on May 26, 2017.

(51) Int. Cl.
| | |
|---|---|
| *E21B 10/46* | (2006.01) |
| *B29C 70/74* | (2006.01) |
| *E21B 10/50* | (2006.01) |
| *E21B 10/08* | (2006.01) |
| *E21B 10/54* | (2006.01) |
| *E21B 10/20* | (2006.01) |
| *E21B 17/10* | (2006.01) |
| *B29L 31/28* | (2006.01) |
| *E21B 10/22* | (2006.01) |

(Continued)

(52) U.S. Cl.
CPC .............. *E21B 10/50* (2013.01); *B29C 70/74* (2013.01); *E21B 10/08* (2013.01); *E21B 10/20* (2013.01); *E21B 10/46* (2013.01); *E21B 10/54* (2013.01); *E21B 17/1085* (2013.01); *B29K 2509/02* (2013.01); *B29L 2031/28* (2013.01); *E21B 10/22* (2013.01); *E21B 10/25* (2013.01)

(58) Field of Classification Search
CPC .. E21B 10/46; E21B 17/1085; E21B 17/1092; B29C 70/74
See application file for complete search history.

(56) References Cited

U.S. PATENT DOCUMENTS

| | | |
|---|---|---|
| 7,413,037 B2 | 8/2008 | Lin et al. |
| 8,079,428 B2 | 12/2011 | Lyons et al. |

(Continued)

*Primary Examiner* — Cathleen R Hutchins
(74) *Attorney, Agent, or Firm* — TraskBritt

(57) ABSTRACT

Hardfacing materials include a polymer matrix material and particles of hard material embedded within and dispersed throughout the polymer matrix material. Earth-boring tools include a tool body and a hardfacing material on at least a portion of a surface of the body, wherein the hardfacing material includes a polymer matrix material and particles of hard material embedded within and dispersed throughout the polymer matrix material. Methods of applying hardfacing material to an earth-boring tool comprise mixing hard particles with a polymer precursor material to form a paste, applying the paste to a surface of an earth-boring tool, and curing the polymer precursor material to form a hardfacing material on the surface of the earth-boring tool.

16 Claims, 5 Drawing Sheets

(51) Int. Cl.
    *E21B 10/25*     (2006.01)
    *B29K 509/02*     (2006.01)

(56) References Cited

U.S. PATENT DOCUMENTS

| | | |
|---|---|---|
| 8,950,515 B2 | 2/2015 | Schroder |
| 8,955,622 B2 * | 2/2015 | Schroder ................. E21B 10/24 175/359 |
| 2010/0224418 A1 * | 9/2010 | Eason ....................... B05D 5/02 175/340 |
| 2013/0180786 A1 * | 7/2013 | Thomas .............. E21B 17/1085 175/434 |
| 2015/0299514 A1 * | 10/2015 | Chiu ................... E21B 17/1085 175/325.1 |
| 2017/0241209 A1 | 8/2017 | Benes et al. |

* cited by examiner

EARTH-BORING TOOLS INCLUDING POLYMER MATRIX COMPOSITE HARDFACING MATERIAL AND RELATED METHODS

CROSS-REFERENCE TO RELATED APPLICATION

This application claims the benefit under 35 U.S.C. § 119(e) of U.S. Provisional Patent Application Ser. No. 62/511,894, filed May 26, 2017, the disclosure of which is hereby incorporated herein in its entirety by this reference.

TECHNICAL FIELD

Embodiments of the present disclosure relate to materials that may be used to increase the resistance to abrasion and erosion of earth-boring tools and components of earth-boring tools used in the formation of wellbores, and to methods of forming and using such materials, tools, and components.

BACKGROUND

Wellbores are formed in subterranean formations for various purposes including, for example, extraction of oil and gas from subterranean formations and extraction of geothermal heat from subterranean formations. A wellbore may be formed in a subterranean formation using an earth-boring rotary drill bit. Different types of earth-boring rotary drill bits are known in the art including, for example, fixed-cutter drill bits (which are often referred to in the art as "drag" bits), roller cone drill bits (which are often referred to in the art as "rock" bits), diamond-impregnated bits, and hybrid bits (which may include, for example, both fixed cutters and roller cone cutters). The drill bit is rotated under an applied axial force, termed "weight on bit" (WOB) in the art, and advanced into the subterranean formation. As the drill bit rotates, the cutters or abrasive structures thereof cut, crush, shear, and/or abrade away the formation material to form the wellbore.

The drill bit is coupled, either directly or indirectly, to an end of what is referred to in the art as a "drill string," which comprises a series of elongated tubular segments connected end-to-end that extends into the wellbore from the surface of the formation. Various tools and components, including the drill bit, may be coupled together at the distal end of the drill string at the bottom of the wellbore being drilled. This assembly of tools and components is referred to in the art as a "bottom hole assembly" (BHA).

The drill bit may be rotated within the wellbore by rotating the drill string from the surface of the formation, or the drill bit may be rotated by coupling the drill bit to a downhole motor, which is also coupled to the drill string and disposed proximate the bottom of the wellbore. The downhole motor may comprise, for example, a hydraulic Moineau-type motor having a shaft, to which the drill bit is coupled. The shaft of the motor is rotated by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore.

The materials of earth-boring tools need to be relatively hard and wear-resistant to efficiently remove formation material within a wellbore without undergoing excessive wear. Due to the extreme forces and stresses to which drill bits and other earth-boring tools are subjected during drilling and reaming operations, the materials of earth-boring tools must simultaneously exhibit relatively high fracture toughness. Materials that exhibit extremely high hardness, however, tend to be relatively brittle and do not exhibit high fracture toughness, while materials that exhibit high fracture toughness tend to be relatively soft and do not exhibit high hardness. As a result, a compromise must be made between hardness and fracture toughness when selecting materials for use in drill bits.

In an effort to simultaneously improve both the hardness and fracture toughness of earth-boring drill bits, composite materials have been applied to the surfaces of drill bits that are subjected to abrasion, erosion, or to both abrasion and erosion. These composite materials are often referred to as "hardfacing" materials. Hardfacing materials typically include at least one phase that exhibits relatively high hardness and another phase that exhibits relatively high fracture toughness.

For example, hardfacing materials often include tungsten carbide particles dispersed throughout a metal or metal alloy matrix material. The tungsten carbide particles are relatively hard compared to the matrix material, and the matrix material is relatively tough compared to the tungsten carbide particles.

Tungsten carbide particles used in hardfacing materials may comprise one or more of cast tungsten carbide particles, sintered tungsten carbide particles, and macrocrystalline tungsten carbide particles. The tungsten carbide system includes two stoichiometric compounds, WC and $W_2C$, with a continuous range of compositions therebetween. Cast tungsten carbide generally includes a eutectic mixture of the WC and $W_2C$ compounds. Sintered tungsten carbide particles include relatively smaller particles of WC bonded together by a matrix material. Cobalt and cobalt alloys are often used as matrix materials in sintered tungsten carbide particles. Sintered tungsten carbide particles can be formed by mixing together a first powder that includes the relatively smaller tungsten carbide particles and a second powder that includes cobalt particles. The powder mixture is formed in a "green" state. The green powder mixture then is sintered at a temperature near the melting temperature of the cobalt particles to form a matrix of cobalt material surrounding the tungsten carbide particles to form particles of sintered tungsten carbide. Finally, macrocrystalline tungsten carbide particles generally consist of single crystals of WC.

Various techniques known in the art may be used to apply a hardfacing material to a surface of an earth-boring tool. For example, automated and manual welding processes may be used to apply hardfacing material to an earth-boring tool. In some manual processes, a welding rod that comprises the hardfacing material is provided, and a torch (e.g., an oxyacetylene torch or an arc-welding torch) is used to heat an end of the rod and, optionally, the surface of the tool to which the hardfacing is to be applied. The end of the rod is heated until at least the matrix material begins to melt. As the matrix material at the end of the rod begins to melt, the melting hardfacing material is applied to the surface of the tool. The hard particles dispersed within the matrix material are also applied to the surface with the molten matrix material. After application, the molten matrix material is allowed to cool and solidify.

Flame spray processes are also used to apply hardfacing materials to earth-boring tools. In a flame spray process, a powder comprising the hard particles and particles of the matrix material is carried by a pressurized fluid (e.g., a pressurized gas) to a nozzle. The powder mixture is sprayed out from the nozzle and through a flame toward the surface of the tool to which the hardfacing is to be applied. The flame causes the particles of matrix material to at least partially melt. As the material is sprayed onto the tool, the molten matrix material cools and solidifies, and the hard particles become embedded in the matrix material to form the hardfacing on the surface of the tool.

Various types of arc welding processes are known in the art and may be used to apply hardfacing to a surface of an earth-boring tool. For example, metal-inert gas (MIG) welding processes, tungsten-inert gas (TIG) welding processes, and plasma-transferred arc (PTA) welding processes may be used to apply hardfacing to a surface of an earth-boring tool.

BRIEF SUMMARY

In some embodiments, the present disclosure includes an earth-boring tool for forming a wellbore in a subterranean formation comprising a tool body and a hardfacing material disposed on at least a portion of a surface of the tool body. The hardfacing material comprises a polymer matrix material and particles of hard material embedded within and dispersed throughout the polymer matrix material.

In additional embodiments, the present disclosure includes a roller cone bit comprising a bit body comprising at least one leg having a counterbore formed therein, a rolling cutter mounted on the at least one leg by a retaining element disposed within the counterbore, and a hardfacing material disposed within the counterbore over the retaining element. The hardfacing material comprises a polymer matrix material and particles of hard material embedded within and dispersed throughout the polymer matrix material.

In further embodiments, the present disclosure includes methods of applying a hardfacing material to a surface of an earth-boring tool in which hard particles are mixed with a polymer precursor material to form a paste, the paste is applied to a surface of the earth-boring tool, and the polymer precursor material is cured to form a hardfacing material on the surface of the earth-boring tool. The hardfacing material comprises a polymer matrix material and particles of hard material embedded within and dispersed throughout the polymer matrix material.

BRIEF DESCRIPTION OF THE DRAWINGS

While the specification concludes with claims particularly pointing out and distinctly claiming that which is regarded as the present invention, various features and advantages of embodiments of the present disclosure may be more readily ascertained from the following description of some embodiments when read in conjunction with the accompanying drawings, in which:

DETAILED DESCRIPTION

The illustrations presented herein are not actual views of any particular earth-boring tool or hardfacing material, but are merely idealized representations that are employed to describe embodiments of the present disclosure.

In accordance with embodiments of the present disclosure, a polymer matrix composite hardfacing material may be applied to a surface of an earth-boring tool to protect the surface of the earth-boring tool from abrasion and/or erosion that might occur during use within a wellbore. The composite hardfacing material includes a continuous matrix phase comprising a polymer, such as an epoxy, and a discontinuous phase dispersed throughout the polymer matrix phase. The discontinuous phase may comprise particles of a hard, wear-resistant material.

Figure 1:
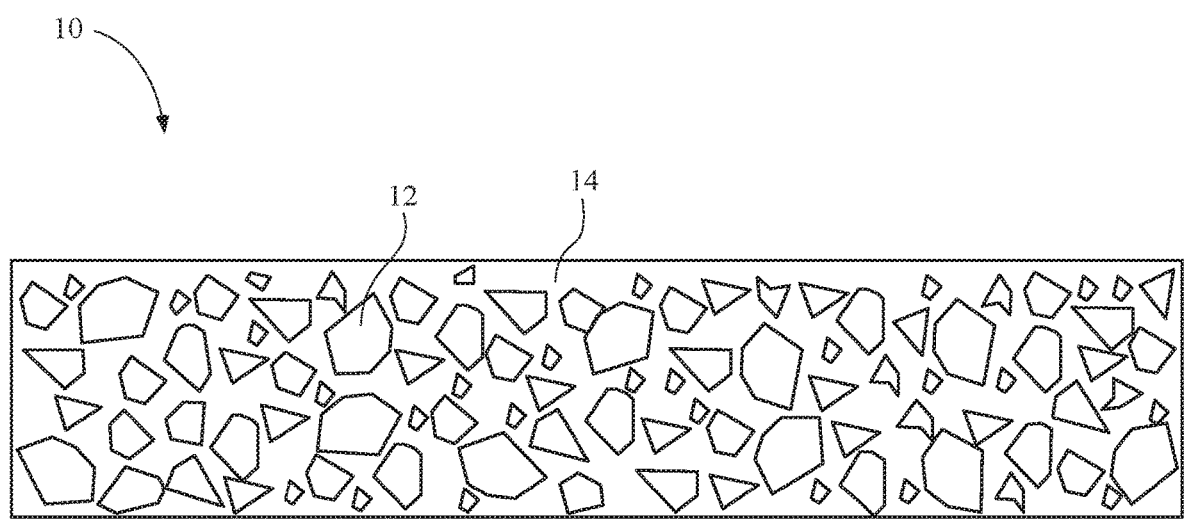
FIG. 1 is a simplified drawing of an embodiment of a hardfacing material of the present disclosure.

FIG. 1 is a simplified drawing illustrating an embodiment of a hardfacing material 10 of the present disclosure. The hardfacing material 10 comprises a composite material that includes a discontinuous or "dispersed" phase 12 embedded within and dispersed throughout a continuous matrix phase 14. The discontinuous phase 12 exhibits a hardness higher than a hardness exhibited by the matrix phase 14.

The matrix phase 14 of the hardfacing material 10 may comprise a polymer material. The polymer material may comprise a thermosetting polymer material. The polymer material may comprise a polymer material that cures at room temperature (e.g., approximately 21° C.). By way of example, the polymer material may comprise an epoxy material. In some embodiments, the polymer material of the matrix phase 14 comprises Bakerlok, and more particularly Bakerlok 199-50 Formula C, which is an aliphatic amine based compound commercially available from Forum Energy Technologies of Houston, Tex. In such embodiments, the matrix phase 14 comprises a resin material cured with a hardener material. The resin material of the matrix phase 14 may comprise about 30%-45% concentration of propane, 2,2-bis[p-(2,3-epoxypropoxy)phenyl]-, polymers (CAS-No. 25085-99-8) and about 10% to 20% concentration of 1,2-epoxy-3-(2-methylphenoxy)propane (CAS-No. 2210-79-9). The hardener material may comprise an amine based epoxy hardener including 10-20% concentration of polyethylpolyamines. In some embodiments, the matrix phase 14 comprising Bakerlok as the matrix phase 14 has a partially cured fracture toughness of about 2.8 ksi at 4 hours and a fully cured fracture toughness of about 4 ksi at 2 days at 25° C.

In other embodiments, the polymer material may comprise an epoxy material, such as EP39MHT, which is commercially available from Master Bond Inc. of Hackensack, N.J. In such embodiments, the matrix phase 14 comprises a resin material cured with a hardener material. The resin material comprises an epoxy resin of bisphenol A epichlorohydrin polymer (CAS No. 25068-38-6), and the hardener material comprises 1) about 25%-50% concentration of benzyl alcohol (CAS No. 100-51-6), 4,4'-methylenebis(cyclohexylamine) (CAS No. 1761-71-3), and formaldehyde, polymer with benzenamine, hydrogenated (CAS No. 135108-88-2), 2) about 25%-50% concentration of diaminopolypropylene glycol (CAS No. 9046-10-0) and poly(propylene glycol) (CAS No. 25322-69-4), and 3) 4,4'-methylenebis(cyclohexylamine) (CAS No. 1761-71-3). Other polymer materials that exhibit appropriate physical properties (e.g., hardness, toughness, modulus of elasticity, etc.) also may be employed in yet further embodiments of the disclosure.

The discontinuous phase 12 may comprise finite spatial volumes of hard material that are dispersed throughout and embedded within the matrix phase 14. In some embodiments, the discontinuous phase may comprise particles of a ceramic material, a metal material, or a ceramic metal matrix composite material (e.g., a cermet material). For example, the discontinuous phase 12 may comprise particles of cemented tungsten carbide (tungsten carbide particles bonded together by a metal binder comprising one or more of cobalt, iron, and nickel), eutectic tungsten carbide, and/or macrocrystalline tungsten carbide. Particles of other carbides, nitrides, and/or oxides, such as transition metal carbides, nitrides, and/or oxides (e.g., titanium diboride, titanium nitride, titanium oxide, etc.) may be employed to form the discontinuous phase 12 of the hardfacing material 10. Particles of aluminum oxide, aluminum nitride, silicon dioxide, and/or silicon nitride also may be employed to form the discontinuous phase 12 of the hardfacing material 10 in yet further embodiments.

The particles forming the discontinuous phase 12 may be irregularly shaped as is shown in FIG. 1 having substantially sharp or angled edges, or they may be regularly shaped (e.g., generally spherical, cylindrical, etc.) having substantially smooth or rounded edges.

In some embodiments, the particles forming the discontinuous phase may be −120/+200 ASTM (American Society for Testing and Materials) mesh size. In other words, the particles may be sized so as to pass through an ASTM No. 120 mesh screen, but so as to not pass through an ASTM No. 200 mesh screen, as defined in ASTM specification E11-04 entitled Standard Specification for Wire Cloth and Sieves for Testing Purposes. In other embodiments, the particles forming the discontinuous phase may be −16/+325 ASTM mesh size. In other words, the particles may be sized so as to pass through an ASTM No. 16 mesh screen, but so as to not pass through an ASTM No. 325 mesh screen, as defined in ASTM specification E11-04.

The mass ratio of the discontinuous phase 12 to the matrix phase 14 may range from approximately 1:1 to 20:1, or more particularly from about 2:1 to 10:1 (e.g., 4.5:1).

The hardfacing material 10 may be applied to surfaces of earth-boring tools using various methods. For example, the polymer material that forms the continuous matrix phase 14 may comprise a two-part mixture (e.g., a polymer precursor and a hardener), and the two parts may be mixed together with the particles that will form the discontinuous phase to form a paste, which may be applied to a surface of an earth-boring tool and allowed to cure. The paste may optionally be heated to promote or enhance the rate of the curing process as needed or desired.

As previously mentioned, the hardfacing material 10 may be applied to a surface of an earth-boring tool to protect the surface of the earth-boring tool from abrasion and/or erosion that might occur during use within a wellbore. Examples of such earth-boring tools are described below with reference to FIGS. 2 through 5.

Figure 2:
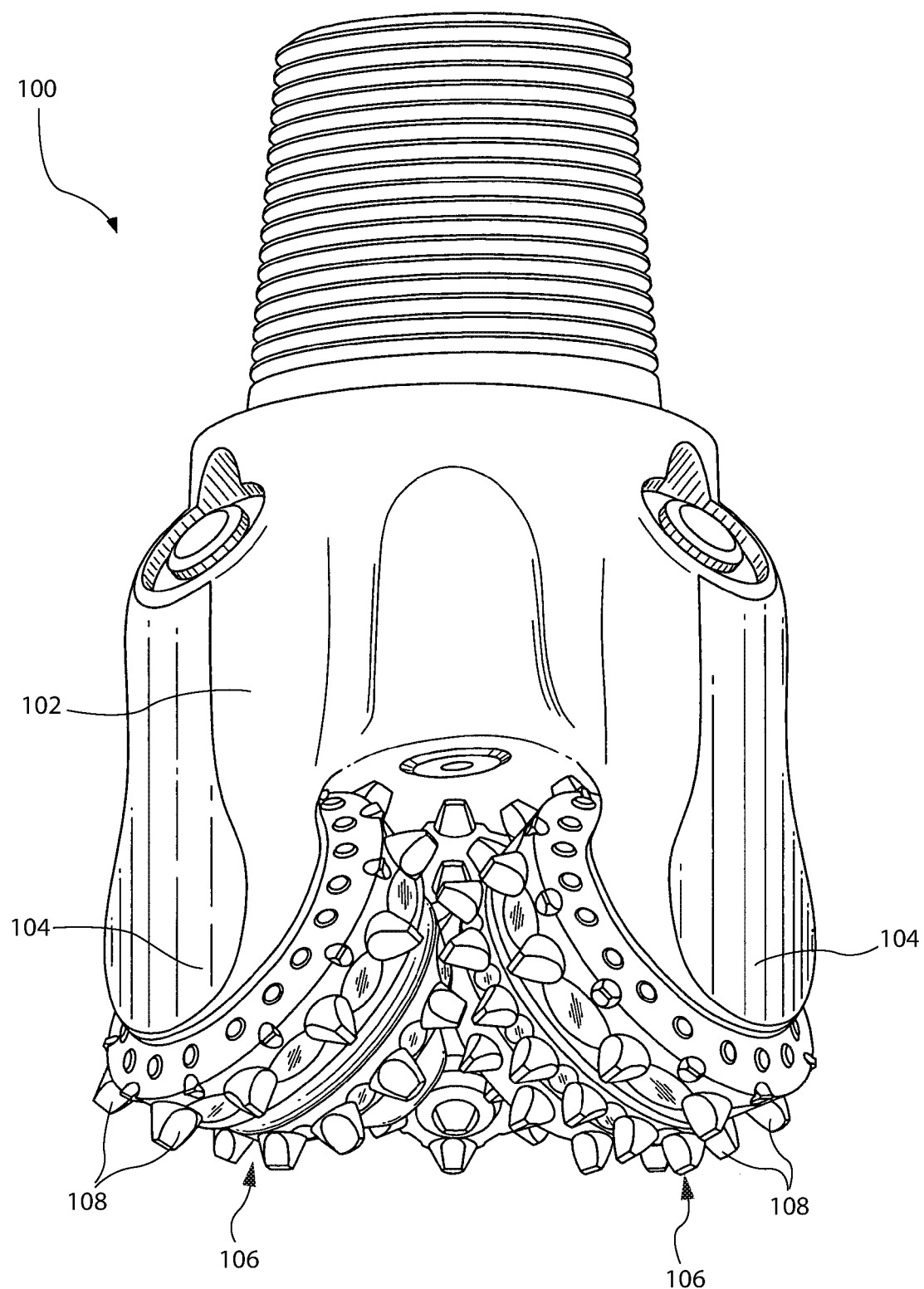
FIG. 2 is a side view of an embodiment of a roller cone earth-boring rotary drill bit of the present disclosure that includes a hardfacing material like that shown in FIG. 1.

FIG. 2 illustrates an earth-boring tool configured for use in a subterranean formation in the form of an earth-boring rotary drill bit 100. The drill bit 100 is a rolling cutter drill bit, and includes a tool body 102 having integral leg members (i.e., bit legs) 104 and rolling cutters 106 mounted on heads protruding from the distal ends of corresponding bit legs 104. As the drill bit 100 is rotated within a wellbore, the rolling cutters 106 rotate on the corresponding heads. As the rolling cutters 106 rotate, cutting structures 108 disposed on the rolling cutters 106 gouge, crush and scrape away formation material so as to drill the borehole in the subterranean formation. The cutting structures 108 illustrated in FIG. 2 comprise inserts (e.g., cemented tungsten carbide and/or polycrystalline diamond inserts), although in other embodiments, the cutting structures 108 may comprise integral teeth formed on the rolling cutters 106 using machining processes.

In some embodiments, a bearing system may be disposed between each of the rolling cutters 106 and the corresponding heads. As a non-limiting example, the bearing system may comprise a bearing system as described in as described in U.S. patent application Ser. No. 15/429,874, which was filed Feb. 10, 2017 and titled "Bearings for Downhole Tools, Downhole Tools Incorporating Such Bearings, and Related Methods," the disclosure of which is incorporated herein in its entirety by this reference. Such a bearing system is illustrated in FIG. 3.

Figure 3:
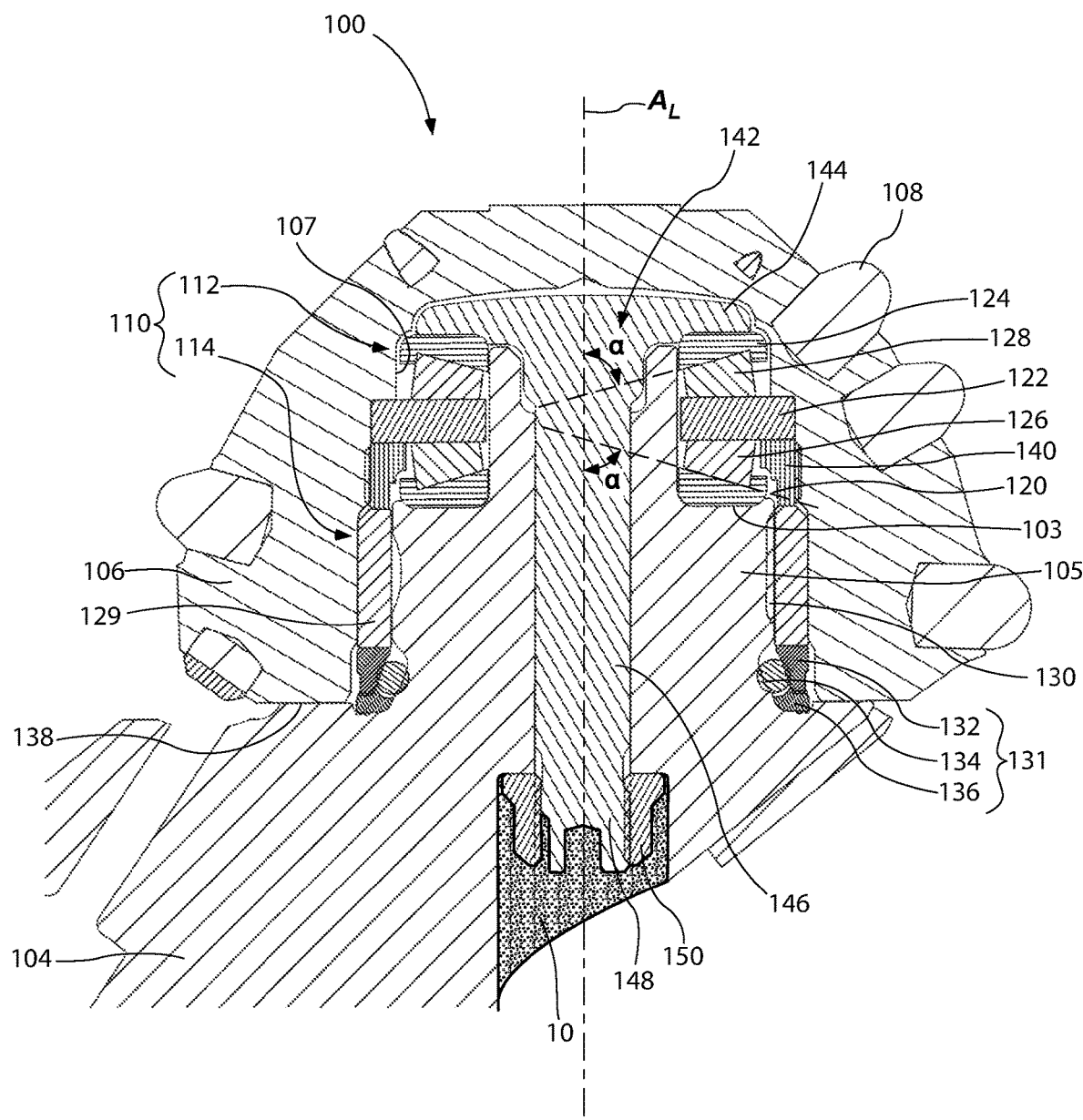
FIG. 3 is a cross-sectional view of a portion of the drill bit of FIG. 2 illustrating a rolling cutter mounted on a corresponding leg of a bit body of the drill bit with a bearing system between the rolling cutter and the leg, and a hardfacing material like that shown in FIG. 1 filling a recess in the leg.

Referring to FIG. 3, a bearing system 110 is disposed between a rolling cutter 106 and a head 105 protruding from a bit leg 104 of the tool body 102 (FIG. 2). The bearing system 110 is configured to bear forces acting between the head 105 and the rolling cutter 106 as the rolling cutter 106 rotates relative to the head 105 during use of the drill bit 100 within a subterranean formation. The bearing system 110 includes a thrust bearing 112 and a radial bearing 114. The thrust bearing 112 is located and configured for bearing forces acting between the rolling cutter 106 and the head 105 in directions generally parallel to the longitudinal axis $A_L$ of the head 105 (and the axis of rotation of the rolling cutter 106), which is referred to herein as the "axial" direction. The radial bearing 114 is located and configured for bearing forces acting between the rolling cutter 106 and the head 105 in directions generally perpendicular to the longitudinal axis $A_L$ of the head 105, which is referred to herein as the "radial" direction.

As shown in FIG. 3, the thrust bearing 112 includes a head washer 120 disposed on the head 105, an at least substantially planar shaft washer 122 retained within the rolling cutter 106 and disposed around the head 105, and a rolling cutter washer 124 retained within the rolling cutter 106. The thrust bearing 112 further includes a first plurality of bearings 126 disposed between the head washer 120 and the shaft washer 122, and a second plurality of bearings 128 disposed between the shaft washer 122 and the rolling cutter washer 124.

The head washer 120 comprises an annular ring member that rests upon a shoulder 103 of the head 105 around an annular protrusion of the head 105. The shaft washer 122 comprises an at least substantially planar annular ring member that also extends around the annular protrusion of the head 105, but is not secured thereto. The upper and lower surfaces of the shaft washer 122 are at least substantially planar (i.e., flat). The rolling cutter washer 124 also comprises an annular ring member that extends around the annular protrusion of the head 105.

In the embodiment of FIG. 3, the first plurality of bearings 126 and the second plurality of bearings 128 comprise tapered rolling bearing elements, each bearing element 126, 128 having the geometry of a truncated solid cone. The upper and lower surfaces of the shaft washer 122 may be at least substantially planar and oriented at least substantially perpendicular to the longitudinal axis $A_L$ of the head 105, such that the upper surfaces of the first plurality of bearings 126 and the lower surfaces of the second plurality of bearings 128 are oriented at least substantially perpendicular to the longitudinal axis $A_L$. The lower surfaces of the first plurality of bearings 126 and the upper surfaces of the second plurality of bearings 128 are oriented at an acute angle α to the longitudinal axis $A_L$. As a non-limiting example, the acute angle α may be in a range extending from about 65° and about 85°, such as about 75°.

The upper surface of the head washer 120 may comprise an angled, frustoconically-shaped surface oriented at the angle α to the longitudinal axis $A_L$ so as to be complementary to the lower surfaces of the first plurality of bearings 126. The head washer 120 may include an axially projecting lip that extends along at least a portion of a radially outer end surface of each of the first plurality of bearings 126. The axially projecting lip and the angled, frustoconically-shaped surface of the head washer 120 prevent the first plurality of bearings 126 from sliding in the radial direction during operation of the drill bit 100.

Similarly, the lower surface of the rolling cutter washer 124 may comprise an angled, frustoconically-shaped surface oriented at the angle α to the longitudinal axis $A_L$ so as to be complementary to the upper surfaces of the second plurality of bearings 128. The rolling cutter washer 124 may include an axially projecting lip that extends along at least a portion of a radially outer end surface of each of the second plurality of bearings 128. The axially projecting lip and the angled, frustoconically-shaped surface of the rolling cutter washer 124 prevent the second plurality of bearings 128 from sliding in the radial direction during operation of the drill bit 100.

The configuration of the thrust bearing 112 may find particular utility in rolling cutters 106 having relatively small diameters of less than about 13.0 centimeters (about 5 inches). For example, in some non-limiting example embodiments, the head washer 120, the shaft washer 122, and the rolling cutter washer 124 may have maximum outer diameters of about 6.5 centimeters or less (about 2.5 inches or less).

The radial bearing 114 may have any suitable configuration. As a non-limiting example, the radial bearing 114 may be a journal bearing comprising an annular sleeve 129 that is coupled to the rolling cutter 106 within the central cavity 107 thereof. For example, the annular sleeve 129 may be secured to the rolling cutter 106 within the central cavity 107 using a shrink fit and/or a press fit. The annular sleeve 129 may comprise a relatively hard and wear-resistant metal, such as a steel alloy.

Optionally, at least a portion of the outer side surface of the head 105 that is located and configured to bear against the annular sleeve 129 may comprise a hardfacing material 130 that has a composition that is relatively harder and/or more wear-resistant relative to the bulk material of the head 105, so as to extend the life of the radial bearing 114. For example, as shown in FIG. 3, at least the radially outward, load-bearing side of the head 105 may be provided with such a hardfacing material 130.

During operation, the interface between the annular sleeve 129 and the adjacent bearing surface of the head 105 may be lubricated with pressure compensated grease or oil. Optionally, one or more recesses may be formed in the radially inward, non-load-bearing side of the head 105, as is shown in FIG. 3. Furthermore, a radial clearance of, for example, from about one micron (1.0 μm) to about three hundred microns (300 μm), and more particularly from about twenty-five microns (25.0 μm) to about one hundred fifty microns (150 μm), may be provided between the inner surface of the annular sleeve 129 and the adjacent outer surface of the head 105 so as to provide a film of lubricating fluid of corresponding dimensions therebetween during operation of the drill bit 100. It is desirable for purposes of assembly of the rolling cutter 106 onto the head 105, as well as for proper operation of the radial bearing 114, to allow for a relatively small amount of clearance and play in the radial direction between an inner surface of the annular sleeve 129 and the adjacent outer surface of the head 105.

One or more seals 131 may be employed to establish a fluid-tight seal between the rolling cutter 106 and the head 105 to prevent exposure of the bearing system 110 to fluids outside the drill bit 100. As a non-limiting example, the drill bit 100 may include an energized metal-faced seal 131 as described in U.S. Pat. No. 7,413,037, issued Aug. 19, 2008, the entire contents of which are hereby incorporated herein in their entirety by this reference. As described therein, the energized metal-faced seal 131 may include a rigid seal ring 132 that engages a rearward end of the annular sleeve 129 of the radial bearing 114, an elastomeric energizer ring 134, which may be an O-ring or another cross-sectional shaped ring, and a secondary seal ring 136. The seal 131 may be located between the base of the head 105 and an inner surface of the rolling cutter 106 proximate a rear surface 138 of the rolling cutter 106.

The rolling cutter 106 may be retained on the head 105 using a retaining member 140, a tensioner bolt 142, and a nut 150.

In particular, the retaining member 140 may secure an enlarged head 144 of the tensioner bolt 142, the rolling cutter washer 124, the second plurality of bearings 128, and the shaft washer 122 within a central cavity 107 of the rolling cutter 106. In some embodiments, the retaining member 140 may comprise a threaded annular ring member having a threaded outer side surface. Complementary threads may be formed on the inner side surface of the rolling cutter 106 within the central cavity 107, such that the threaded annular ring member may be threaded to the rolling cutter 106 within the central cavity 107. In this configuration, the enlarged head 144 of the tensioner bolt 142, the rolling cutter washer 124, the second plurality of bearings 128, and the shaft washer 122 within the central cavity 107 of the rolling cutter 106 are secured between the blind end or bottom of the central cavity 107 (the upper end of the central cavity 107 from the perspective of FIG. 3) and the retaining member 140. In other embodiments, the retaining member 140 may be secured to the rolling cutter 106 within the central cavity 107 using a threadless connection. For example, the retaining member 140 may be secured to the rolling cutter 106 within the central cavity 107 using a shrink fit and/or a press fit.

As noted above, the head washer 120 may be positioned on a shoulder 103 of the head 105. In some embodiments, the head washer 120 may be secured around an annular protrusion of the head 105 using a shrink fit and/or a press fit. In other embodiments, the head washer 120 may include threads on an inner side surface thereof, and complementary threads may be formed on an outer side surface of the annular protrusion of the head 105, such that the head washer 120 may be threaded onto the annular protrusion of the head 105 until it bears against the shoulder 103 of the head 105. After positioning the head washer 120 over and around the annular protrusion of the head 105 and on the shoulder 103 of the head 105, the first plurality of bearings 126 may be positioned on the head washer 120.

After inserting the tensioner bolt 142, the rolling cutter washer 124, the second plurality of bearings 128, and the shaft washer 122 into the central cavity 107 and securing these components within the central cavity 107 of the rolling cutter 106 using the retaining member 140, an elongated shaft 146 of the tensioner bolt 142 that extends from the enlarged head 144 may be inserted through a complementary hole of the head 105, and the nut 150 may be threaded onto a threaded end 148 of the elongated shaft 146. As the nut 150 is tightened on the threaded end 148 of the elongated shaft 146 of the tensioner bolt 142, the elongated shaft 146 of the tensioner bolt 142 is placed in a state of tension, and the enlarged head 144 of the tensioner bolt 142 compresses the components of the thrust bearing 112 between the enlarged head 144 and the shoulder 103 of the head 105.

The rolling cutter 106 may be secured to the head 105 generally as described in U.S. Pat. No. 8,950,515, issued Feb. 10, 2015 to Schroder, and in U.S. Pat. No. 8,955,622, issued Feb. 17, 2015 to Schroder, the disclosure of each of which is hereby incorporated herein in its entirety by this reference. In addition, the thrust bearing 112 and/or the radial bearing 114 may be lubricated using grease or other lubricating fluid, and a pressure compensating system as described in the aforementioned U.S. Pat. Nos. 8,950,515 and 8,955,622 may be used to ensure that the pressure of the grease or other lubricating fluid is maintained at substantial equal pressure to the fluid pressure outside the drill bit.

A keyed interface may be provided between the enlarged head 144 of the tensioner bolt 142 and the rolling cutter washer 124 so as to prevent rotation of the rolling cutter washer 124 about the head 105 during operation of the drill bit 100. The shaft washer 122 is fixed to the rolling cutter 106 by the retaining member 140, such that the shaft washer 122 rotates with the rolling cutter 106 between the first plurality of bearings 126 and the second plurality of bearings 128 during operation of the drill bit 100. Thus, during rotation of the rolling cutter 106 about the longitudinal axis $A_L$ of the head 105, the head washer 120 and the rolling cutter washer 124, and the tensioner bolt 142 are fixed in static position relative to the head 105, while the shaft washer 122 and the retaining member 140 rotate with the rolling cutter 106 about the head 105.

Due to the fact that the components of the thrust bearing 112 are compressed between the enlarged head 144 of the tensioner bolt 142 and the shoulder 103 of the head 105, there may be little to no play between the rolling cutter 106 and the head 105 in the axial direction. As discussed above, however, a predetermined amount of clearance between the inner side surface of the annular sleeve 129 and the adjacent outer side surface of the head 105 in the radial bearing 114 may be required for assembly of the rolling cutter 106 with the head 105, and/or for proper operation of the radial bearing 114. As a non-limiting example, a clearance of from about one micron (1.0 μm) to about three hundred microns (300 μm), and more particularly from about twenty-five microns (25.0 μm) to about one hundred fifty microns (150 μm), may be provided between the inner side surface of the annular sleeve 129 and the adjacent outer side surface of the head 105 in the radial bearing 114. At least one component of the thrust bearing 112 may be capable of sliding radially relative to at least one other component of the thrust bearing 112 so as to accommodate the play in the radial bearing 114 in the radial direction, even though the thrust bearing 112 is in a state of compression with little to no play between the rolling cutter 106 and the head 105 in the axial direction.

For example, in the embodiment of FIG. 3, the at least substantially planar shaft washer 122 may be capable of sliding radially relative to the first plurality of bearings 126 and the second plurality of bearings 128 so as to accommodate the play in the radial bearing 114 in the radial direction. A clearance gap may be provided between the inner side surface of the shaft washer 122 and the adjacent outer side surface of the head 105 that is equal to or greater than the predetermined amount of clearance between the inner side surface of the annular sleeve 129 and the adjacent outer side surface of the head 105 in the radial bearing 114. As a non-limiting example, if the predetermined amount of clearance between the inner side surface of the annular sleeve 129 and the adjacent outer side surface of the head 105 in the radial bearing 114 is one hundred microns (100 μm), the clearance gap between the inner side surface of the shaft washer 122 and the adjacent outer side surface of the head 105 may be one hundred microns (100 μm) or more, one hundred fifty microns (150 μm) or more, or even two hundred fifty microns (250 μm) or more.

Furthermore, during operation of the drill bit 100, when the net force acting on the rolling cutter 106 is oriented so as to urge the rolling cutter 106 in the axial direction onto the head 105, such as during a normal drilling operation, the first plurality of bearings 126 may bear a higher compressive load than the second plurality of bearings 128. When the net force acting on the rolling cutter 106 is oriented so as to urge the rolling cutter 106 in the axial direction off the head 105, as may be encountered during a forward reaming operation or a backward reaming operation in which a previously drilled borehole is being enlarged by the drill bit 100, the second plurality of bearings 128 may bear a higher compressive load than the first plurality of bearings 126.

With continued reference to FIG. 3, a counter bore recess may be formed in the head 105 for receiving the nut 150 therein. A hardfacing material 10 as described hereinabove may be provided in the counter bore recess, as shown in FIG. 3, to protect the nut 150 and the threaded end 148 of the elongated shaft 146 (as well as the surrounding surfaces of the head 105) from abrasion and erosion during operation.

Conventional hardfacing compositions typically comprise hard particles in a metal matrix material, and are applied using high-temperature welding or flame spraying processes. It has been discovered that such conventional hardfacing compositions and techniques for applying hardfacing compositions can result in residual stresses within the head 105 and/or bit leg 104, which can lead to early fatigue cracking and failure, since the area in which it is applied is across the bending plane of the bit leg 104. By employing hardfacing material 10 and application methods of the present disclosure, such heating of the bit leg 104 and head 105 can be avoided, thereby avoiding or reducing residual stresses and improved fatigue strength. Furthermore, the hardfacing material 10 of the present disclosure can be more easily removed after use of the drill bit 100 for repair and/or replacement of the rolling cutter 106 and/or bearing system 110. Such repair and/or replacement could be performed at the location at which the drill bit 100 is being used (e.g., at a drilling rig), since the hardfacing material 10 does not require any specialized equipment for application such as welding or flame spraying equipment. In some embodiments, a method of repairing the drill bit 100 or removing and/or replacing the rolling cutter 106 and/or bearing system 110 includes removing the hardfacing material 10 from a surface of the tool on which it is employed. The hardfacing material 10 may be formulated and configured to be removed in a substantially solid state and may be removed by fracturing. For instance, the hardfacing material 10 may be removed and fractured by air chiseling or other pneumatic hand tools. In some embodiments, a pneumatic hammer chisel including a round pointed tool attachment, for example, may be used to fracture the hardfacing material 10. In other words, impact forces imposed by a tool (e.g., a hand tool or pneumatic tool) may be applied to initiated the removal process. As a non-limiting example, a tip of the tool attachment having a radius between about 0.063 in. and about 0.125 in. may be used to fracture the hardfacing material 10. Further, small drills may be used to remove the hardfacing material 10 from hardware (e.g., nut 150) prior to removing such hardware using conventional tools.

In yet additional embodiments of the present disclosure, a separately fabricated plug or cap may be formed to fit within the counter bore recess (where the hardfacing material 10 is disposed in FIG. 3), and the plug or cap may be secured in the counter bore recess using a polymer material, such as any of the polymer materials described herein for use as the continuous matrix phase 14 of the hardfacing material 10 (e.g., an epoxy, such as Bakerlok). The plug or cap may comprise a wear resistant and erosion resistant material, such as a cemented tungsten carbide material, or any of the materials described herein for use as the discontinuous phase 12 of the hardfacing material 10.

The hardfacing material 10 as described herein may be non-magnetic, in contrast to many conventional hardfacing materials. As a result, the hardfacing material 10 may be employed on other downhole tools where use of magnetic materials must be avoided, such as logging-while-drilling (LWD) or measurement-while-drilling (MWD) tools, which may include magnetically-sensitive sensors.

Figure 4:
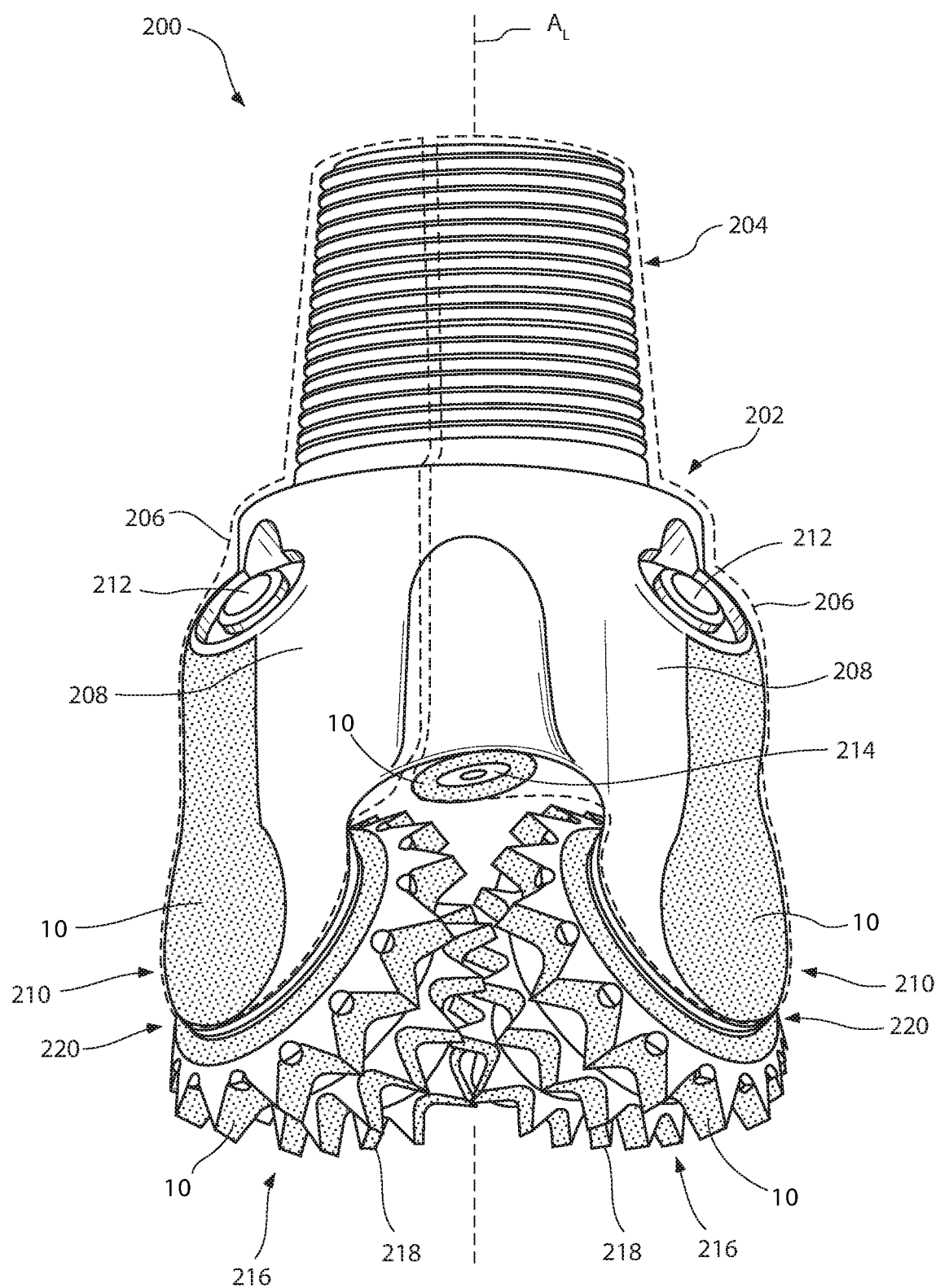
FIG. 4 is a side view of an embodiment of a roller cone earth-boring rotary drill bit of the present disclosure that includes a hardfacing material like that shown in FIG. 1 on various surfaces of the drill bit.

Although FIG. 3 illustrates the hardfacing material 10 applied within the counter bore recess in the head 105 of the drill bit 100, the hardfacing material 10 may be employed on any other surfaces of earth-boring tools in accordance with additional embodiments of the present disclosure. For example, FIG. 4 illustrates another embodiment of a roller cone drill bit 200 of the present disclosure. The roller cone drill bit 200 includes a bit body 202 having threads 204 at its proximal longitudinal end for connection to a drill string (not shown). The bit body 202 may comprise a plurality (e.g., three) of bit legs 206 (which are separated by the dotted lines in FIG. 4) that are welded together concentrically about a longitudinal axis $A_L$ of the roller cone drill bit 200. The threads 204 may be machined in the conical shank region of the bit body 202 after welding together the bit legs 206. Two of the bit legs 206 are visible from the perspective of FIG. 4.

Each bit leg 206 comprises a proximal section 208 nearest the threads 204 and a bit head 210 depending distally therefrom. Each proximal section 208 of the roller cone drill bit 200 may include a lubricant fluid pressure compensator 212, as known in the art. At least one nozzle 214 may be provided in the bit body 202 for controlling the direction and velocity of pressurized drilling fluid flowing through the bit body 202 and out from the nozzle 214 during drilling operations. A roller cone cutter 216 is rotatably secured to a bearing shaft (not shown) of each respective bit head 210 of bit body 202. By way of example, the drill bit 200 has three roller cone cutters 216, one of which is obscured from view from the perspective of FIG. 4. Each roller cone cutter 216 has rows of cutting elements 218. The cutting elements 218 may comprise cutting teeth, which may be machined in exterior surfaces of the bodies of the roller cone cutters 216. Alternatively, the cutting elements 218 may comprise separately formed inserts, which may be formed from a wear-resistant material such as cemented tungsten carbide and pressed into recesses drilled or otherwise formed in exterior surfaces of the bodies of the roller cone cutters 216.

The roller cone drill bit 200 of FIG. 4 may include hardfacing material 10 on one or more surfaces of the roller cone drill bit 200. By way of example and not limitation, the outer surfaces of the bit legs 206, including exterior surfaces of both the proximal sections 208 of the bit legs 206 and the bit heads 210 of the bit legs 206 may comprise hardfacing material 10 thereon. Furthermore, hardfacing material 10 may be provided on various surfaces of the roller cone cutters 216. For example, hardfacing material 10 may be provided on gage surfaces 220 of the roller cone cutters 216, on the cutting elements 218 (e.g., on cutting teeth), or on both the gage surfaces 220 and on the cutting elements 218. Hardfacing material 10 also may be applied to surfaces of the roller cone drill bit 200 within the fluid passageways (not shown) extending through the roller cone drill bit 200, as well as to surfaces of the roller cone drill bit 200 proximate the nozzles 214, and other surfaces that might be susceptible to fluid erosion during drilling operations.

Figure 5:
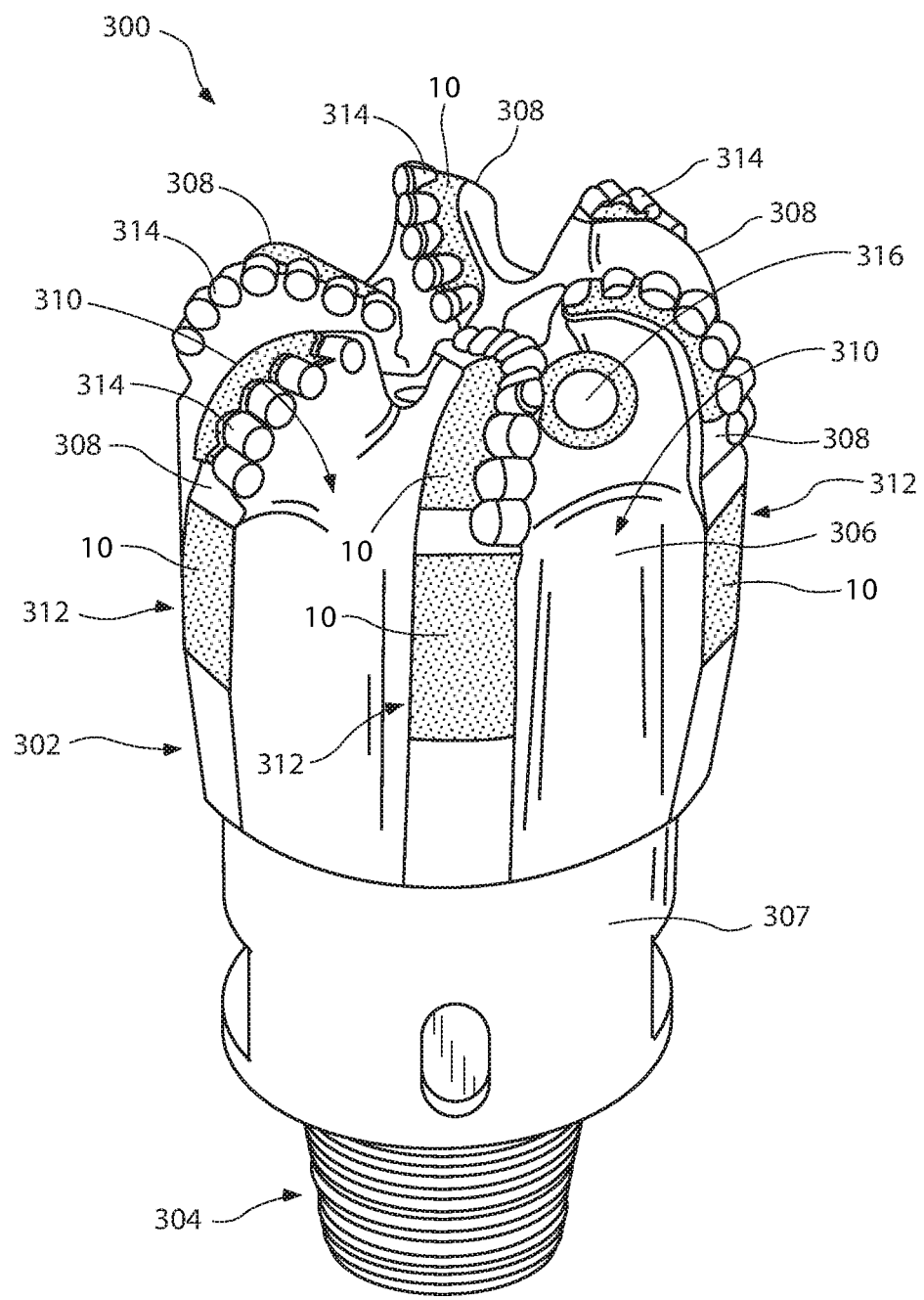
FIG. 5 is a perspective view of an embodiment of a fixed-cutter earth-boring rotary drill bit of the present disclosure that includes a hardfacing material like that shown in FIG. 1 on various surfaces of the drill bit.

FIG. 5 illustrates an embodiment of a fixed-cutter drill bit 300 of the present disclosure. The fixed-cutter drill bit 300 includes a bit body 302 having threads 304 at its proximal longitudinal end for connection to a drill string (not shown). The bit body 302 may comprise a crown 306, which may be formed from a particle-matrix composite material (e.g., a cemented tungsten carbide material) or a metal alloy (e.g., steel). The crown 306 may be attached to a shank 307, and the threads 304 may be machined in the shank 307.

The crown 306 of the fixed-cutter drill bit 300 may comprise a plurality of blades 308 that are separated from one another by fluid passageways 310. The blades 308 may extend over the face of the crown 306 from a central cone region of the crown 306 to a gage region of the crown 306. Radially outer surfaces of the blades 308 in the gage region of the crown 306 comprise gage surfaces 312 of the fixed-cutter drill bit 300. These gage surfaces 312 define the diameter of any wellbore drilled by the fixed-cutter drill bit 300. The portions of the fluid passageways 310 between the blades 308 in the gage region of the crown 306 are often referred to in the art as "junk slots."

A plurality of cutting elements 314 may be fixedly attached to each of the blades 308. The cutting elements 314 may comprise, for example, PDC cutting elements. Fluid passageways (not shown) also extend through the fixed-cutter drill bit 300 to nozzles 316 to allow drilling fluid to be pumped through the drill string (not shown) and the fixed-cutter drill bit 300 and out the nozzles 316 during drilling operations.

The fixed-cutter drill bit 300 of FIG. 5 may include hardfacing material 10 as previously described herein on one or more surfaces of the fixed-cutter drill bit 300. By way of example and not limitation, the gage surfaces 312 may comprise hardfacing material 10 thereon. Furthermore, hardfacing material 10 may be provided on various formation-engaging surfaces of the blades 308. Hardfacing material 10 also may be applied to surfaces of the fixed-cutter drill bit 300 within the fluid passageways (not shown) extending through the fixed-cutter drill bit 300, as well as to surfaces of the fixed-cutter drill bit 300 proximate the nozzles 316, and other surfaces that might be susceptible to fluid erosion during drilling operations.

Thus, surfaces of earth-boring tools such as, for example, the roller cone drill bit 200 of FIG. 4 and the fixed-cutter drill bit 300 of FIG. 5, may be hardfaced by mixing particles of hard material with a polymer precursor material, which may be cured or otherwise hardened to form the hardfacing material 10, as previously described herein.

In yet further embodiments of the present disclosure, hardfacing material 10 as described herein may be applied to other types of drill bits (e.g., hybrid drill bits, coring bits, etc.) or other earth-boring tools (e.g., fixed-wing reamers, expandable reamers, etc.), as well as to non-boring downhole tools (e.g., LWD or MWD tools, packers, drill pipe, etc.).

The following example serves to explain embodiments of the disclosure in more detail. The example is not to be construed as exhaustive or exclusive as to the scope of the disclosure.

Working Example

Performance Data

The suitability of using the hardfacing material 10 including a discontinuous phase 12, including hard particles of cemented carbide, in a matrix phase 14 of Bakerlok on surfaces of earth-boring tools was analyzed. Transverse Rupture Strength ("TRS") tests according to ASTM 406 "Transverse Rupture Strength of Cemented Carbides" procedure were performed on samples (Bakerlok 1, Bakerlok 2) including a continuous phase of Bakerlok as previously described herein and lacking a discontinuous phase and on samples (Bakerlok/hardfacing 1, Bakerlok/hardfacing 2) of the hardfacing material 10 including a matrix phase 14 of Bakerlok as previously described herein and a discontinuous phase 12 of cemented carbide particles. The testing procedure utilized specimen size, fixtures, and testing equipment (MTS) as known in the industry to test various hardfacing and matrix materials used on surfaces of earth-boring tools. Further, the testing was performed with a controlled applied load with a ramp rate of 0.002 in./sec. with continued load until failure. The results of the TRS tests are shown in Table 1 including the load at failure, the height and width of each sample, and the transverse rupture strength (TRS).

TABLE 1

TRS Test Results

| Specimens | Load (lbs.) | Height (in.) | Width (in.) | TRS (ksi) |
| --- | --- | --- | --- | --- |
| Bakerlok 1 | 110 | 0.252 | 0.251 | 8 |
| Bakerlok 2 | 103 | 0.252 | 0.250 | 7 |
| Bakerlok/hardfacing 1 | 93 | 0.251 | 0.251 | 7 |
| Bakerlok/hardfacing 2 | 111 | 0.252 | 0.253 | 8 |

As shown in Table 1, each of the specimens exhibited stable TRS with results between 7 ksi and 8 ksi. Further, field testing was conducted by applying Bakerlok with hardfacing to steel bits and it was determined that the material was not corrosively affected by the drilling environment. The hardfacing material 10 was observed to be relatively more corrosive resistant than metal surfaces of an earth-boring tool (e.g., a steel bit body). Therefore, test results show that use of Bakerlok and Bakerlok with hard particles provided a comparable level of material strength as well as corrosion resistance, which test results were unexpected given the properties of the material (i.e., an epoxy). Further, the hardfacing material 10 including Bakerlok with hard particles provides improved wear and abrasion resistance to the surfaces of the earth-boring tools to which they are applied.

The foregoing description is directed to particular embodiments for the purpose of illustration and explanation. It will be apparent, however, to one skilled in the art that many modifications and changes to the embodiments set forth above are possible without departing from the scope of the embodiments disclosed herein as hereinafter claimed, including legal equivalents. For example, elements and features disclosed in relation to one embodiment may be incorporated into the other embodiments without departing from the scope of the present disclosure. It is intended that the following claims be interpreted to embrace all such modifications and changes.

What is claimed is:

1. An earth-boring tool for forming a borehole in a subterranean formation, comprising:
   a tool body; and
   a hardfacing material disposed on at least a portion of a surface of the tool body, the hardfacing material comprising a continuous phase of polymer matrix material and a discontinuous phase of particles of hard material embedded within and dispersed throughout the polymer matrix material, the continuous phase of polymer matrix material being continuous throughout the hardfacing material, the polymer matrix material comprising a resin material and a hardener material, wherein:
   the resin material comprises:
      propane, 2,2-bis[p-(2,3-epoxypropoxy)phenyl]-, polymers; and
      1,2-epoxy-3-(2-methylphenoxy)propane; and
   the hardener material comprises polyethylpolyamines; or wherein:
   the resin material comprises an epoxy resin of bisphenol A epichlorohydrin polymer; and
   the hardener material comprises:
      benzyl alcohol;
      4-4'-methylenebis(cyclohexylamine);
      formaldehyde, polymer with benzenamine, hydrogenated;
      diaminopolypropylene glycol; and
      poly(propylene glycol),
   the earth-boring tool comprising the tool body and the hardfacing material upon completion of fabrication of the earth-boring tool.

2. The earth-boring tool of claim 1, wherein the tool body comprises a body of a roller cone drill bit, the roller cone drill bit comprising at least one bit leg and a rolling cutter mounted to the at least one bit leg by a tensioner bolt and a nut.

3. The earth-boring tool of claim 2, wherein the tensioner bolt and the nut are disposed in a counter bore recess extending at least partially through the at least one bit leg of the roller cone drill bit, and wherein the hardfacing material is disposed over a portion of the tensioner bolt and the nut within the counter bore recess.

4. The earth-boring tool of claim 1, wherein the tool body comprises a bit body of a fixed-cutter rotary drill bit and wherein the hardfacing material is disposed on an exterior surface of the bit body.

5. The earth-boring tool of claim 4, wherein the hardfacing material is disposed on at least one of a formation-engaging surface of a blade and a surface subject to fluid flow erosion within a fluid passageway.

6. The earth-boring tool of claim 1, wherein the particles of hard material have a greater hardness than the polymer matrix material.

7. The earth-boring tool of claim 1, wherein the particles of hard material comprise particles of at least one of a ceramic material, a metal material, or a ceramic metal matrix composite material.

8. The earth-boring tool of claim 1, wherein the particles of hard material comprise particles of at least one of cemented tungsten carbide, eutectic tungsten carbide, or macrocrystalline tungsten carbide.

9. The earth-boring tool of claim 1, wherein the particles of hard material comprise at least one of aluminum oxide or silicon dioxide.

10. The earth-boring tool of claim 1, wherein a mass ratio of the particles of hard material to the polymer matrix material is in a range extending from 1:1 to 20:1.

11. The earth-boring tool of claim 1, wherein a mass ratio of the particles of hard material to the polymer matrix material is in a range extending from 2:1 to 10:1.

12. A roller cone bit, comprising:
a bit body comprising at least one leg, the at least one leg having a counterbore formed therein;
a rolling cutter mounted on the at least one leg by a retaining element disposed within the counterbore; and
a hardfacing material disposed within the counterbore over the retaining element, the hardfacing material comprising a polymer matrix material and particles of hard material embedded within and dispersed throughout the polymer matrix material, the polymer matrix material providing a continuous phase throughout the hardfacing material, the polymer matrix material comprising a resin material and a hardener material,
wherein:
the resin material comprises:
propane, 2,2-bis[p-(2,3-epoxypropoxy)phenyl]-, polymers; and
1,2-epoxy-3-(2-methylphenoxy)propane; and
the hardener material comprises polyethylpolyamines; or wherein:
the resin material comprises an epoxy resin of bisphenol A epichlorohydrin polymer; and
the hardener material comprises:
benzyl alcohol;
4-4'-methylenebis(cyclohexylamine);
formaldehyde, polymer with benzenamine, hydrogenated;
diaminopolypropylene glycol; and
poly(propylene glycol),
the roller cone bit comprising the bit body, the rolling cutter, and the hardfacing material upon completion of fabrication of the roller cone bit.

13. A method of forming an earth-boring tool for forming a borehole in a subterranean formation, the method comprising:
mixing particles of hard material with a polymer precursor material to form a paste, the polymer precursor material comprising a resin material and a hardener material,
wherein:
the resin material comprises:
propane, 2,2-bis[p-(2,3-epoxypropoxy)phenyl]-, polymers; and
1,2-epoxy-3-(2-methylphenoxy)propane; and
the hardener material comprises polyethylpolyamines; or wherein:
the resin material comprises an epoxy resin of bisphenol A epichlorohydrin polymer; and
the hardener material comprises:
benzyl alcohol;
4-4'-methylenebis(cyclohexylamine);
formaldehyde, polymer with benzenamine, hydrogenated;
diaminopolypropylene glycol; and
poly(propylene glycol);
applying the paste to a surface of a tool body; and
curing the polymer precursor material to form a hardfacing material disposed on at least a portion of a the surface of the tool body, the hardfacing material comprising a continuous phase of polymer matrix material and a discontinuous phase of the particles of hard material embedded within and dispersed throughout the polymer matrix material, the continuous phase of polymer matrix material being continuous throughout the hardfacing material, the polymer matrix material comprising the resin material and the hardener material,
the earth-boring tool comprising the tool body and the hardfacing material upon completion of fabrication of the earth-boring tool.

14. The method of claim 13, wherein mixing the particles of hard material with the polymer precursor material to form the paste comprises mixing particles of at least one of cemented tungsten carbide, eutectic tungsten carbide, or macrocrystalline tungsten carbide with the polymer precursor material.

15. The method of claim 13, wherein mixing the particles of hard material with the polymer precursor material to form the paste comprises mixing particles of at least one of aluminum oxide, aluminum nitride, silicon dioxide, or silicon nitride with the polymer precursor material.

16. The method of claim 13, wherein mixing the particles of hard material with the polymer precursor material to form the paste comprises mixing the particles of hard material with the polymer precursor material in a mass ratio of the particles of hard material to the polymer precursor material in a range extending from 2:1 to 10:1.

* * * * *